United States Patent
Kim

(10) Patent No.: US 10,986,485 B2
(45) Date of Patent: Apr. 20, 2021

(54) METHOD FOR MEASURING MOBILITY STATE OF TERMINAL AND APPARATUS FOR SUPPORTING SAME

(71) Applicant: LG Electronics Inc., Seoul (KR)

(72) Inventor: Sangwon Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/484,749

(22) PCT Filed: Feb. 9, 2018

(86) PCT No.: PCT/KR2018/001733
§ 371 (c)(1),
(2) Date: Aug. 8, 2019

(87) PCT Pub. No.: WO2018/147667
PCT Pub. Date: Aug. 16, 2018

(65) Prior Publication Data
US 2020/0008043 A1   Jan. 2, 2020

Related U.S. Application Data

(60) Provisional application No. 62/456,668, filed on Feb. 9, 2017.

(51) Int. Cl.
*H04W 8/08*   (2009.01)
(52) U.S. Cl.
CPC ..................... *H04W 8/08* (2013.01)
(58) Field of Classification Search
CPC ..................................... H04W 8/08
See application file for complete search history.

(56) References Cited

U.S. PATENT DOCUMENTS

| | | | |
|---|---|---|---|
| 9,591,581 B2* | 3/2017 | Yiu | H04L 5/14 |
| 2009/0047954 A1* | 2/2009 | Tenny | H04W 48/20 |
| | | | 455/435.3 |
| 2011/0269462 A1* | 11/2011 | Sagfors | H04W 36/36 |
| | | | 455/436 |
| 2014/0228032 A1* | 8/2014 | Jung | H04W 36/32 |
| | | | 455/436 |
| 2015/0050934 A1* | 2/2015 | Jung | H04W 36/0083 |
| | | | 455/437 |
| 2015/0111579 A1* | 4/2015 | Arunachalam | H04W 36/32 |
| | | | 455/436 |

(Continued)

FOREIGN PATENT DOCUMENTS

| | | | |
|---|---|---|---|
| KR | 20140064889 A | 5/2014 | |
| KR | 20150005421 A | 1/2015 | |

(Continued)

OTHER PUBLICATIONS

Merwaday et al., Handover Count Based Velocity Estimation and Mobility State Detection in Dense HetNets, Apr. 5, 2016.

*Primary Examiner* — Steven S Kelley
(74) *Attorney, Agent, or Firm* — Dentons US LLP

(57) ABSTRACT

Disclosed are a method for measuring a mobility state of a terminal and an apparatus for supporting same. The method comprises the steps of: receiving, from a current cell, a mobility value related to a previous cell when a terminal moves from the previous cell to the current cell; storing the received mobility value; and measuring the mobility state of the terminal on the basis of the stored mobility value.

13 Claims, 9 Drawing Sheets

(56) References Cited

U.S. PATENT DOCUMENTS

2015/0327127 A1* 11/2015 Centonza .......... H04W 36/0055
455/436
2016/0044569 A1 2/2016 Lunden et al.
2016/0360438 A1* 12/2016 Yiu ....................... H04W 24/10

FOREIGN PATENT DOCUMENTS

KR 1020160108483 A 9/2016
WO 2014010977 A1 1/2014

\* cited by examiner

METHOD FOR MEASURING MOBILITY STATE OF TERMINAL AND APPARATUS FOR SUPPORTING SAME

CROSS-REFERENCE TO RELATED APPLICATIONS

This application is the National Stage filing under 35 U.S.C. 371 of International Application No. PCT/KR2018/001733, filed on Feb. 9, 2018, which claims the benefit of U.S. Provisional Application No. 62/456,668 filed on Feb. 9, 2017, the contents of which are all hereby incorporated by reference herein in their entirety.

BACKGROUND OF THE INVENTION

Field of the Invention

The present invention relates to a technology that measures a mobility state of a terminal.

Related Art

In order to meet the demand for wireless data traffic since the 4th generation (4G) communication system came to the market, there are ongoing efforts to develop enhanced 5th generation (5G) communication systems or pre-5G communication systems. For the reasons, the 5G communication system or pre-5G communication system is called the beyond 4G network communication system or post long-term evolution (LTE) system.

In order to achieve a high data rate, it is considered to implement a super high frequency (millimeter wave (mm-Wave)) band, e.g., 60 GHz band, in the 5G communication system. To decrease a propagation loss of a radio wave and increase a transmission distance in the super high frequency band, beamforming, massive multiple-input multiple-output (MIMO), Full Dimensional MIMO (FD-MIMO), array antenna, analog beamforming, and large scale antenna techniques are discussed in the 5G communication system.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

SUMMARY OF THE INVENTION

According to mobility state estimation (MSE) in the related art, the size of a cell where a terminal stays and inter-frequency cell reselection or not are not considered. Specifically, a case where the terminal moves from a cell having a large size to another cell has a difference in mobility state of the terminal from a case where the terminal moves from a cell having a small size to another cell. For example, the terminal that moves to another cell passing through the cell having the large size may have a higher mobility state than the terminal that moves to another cell passing through the cell having the small size. In addition, when the terminal moves to another frequency in the same cell, that is, when the terminal performs the inter-frequency cell reselection, the terminal is considered to move to another cell even though the terminal may not substantially move.

In an aspect, provided is a method for measuring, by a terminal, a mobility state in a wireless communication system, which includes: receiving, from a current cell, a mobility value related to a previous cell when a terminal moves from the previous cell to the current cell; storing the received mobility value; and measuring the mobility state of the terminal on the basis of the stored mobility value.

The mobility value may be determined based on the size of the previous cell or whether the movement to the current cell is by inter-frequency cell reselection.

The mobility value may have a larger value as the size of the previous cell is larger.

The mobility value may have a smaller value as the coverage of the previous cell and the coverage of the current cell more overlap each other.

The measuring may include calculating a sum of one or more mobility values stored for a set time, and measuring the mobility state of the terminal by comparing the calculated sum and a predetermined mobility state threshold value.

Corresponding validity timers may be allocated to the mobility values, respectively, and the measuring may include deleting a mobility value whose validity timer expires from a list storing the mobility values.

The method may further include: before performing the receiving of the mobility value related to the previous cell, receiving, from the current cell, a default mobility value set by a network when the terminal is powered on.

The terminal may be in an RRC connected state or an RRC idle state.

When the terminal is in the RRC connected state, the terminal may move to the current cell through a handover procedure and when the terminal is in the RRC idle state, the terminal may move to the current cell through a cell reselection procedure.

In another aspect, provided is a terminal for measuring a mobility state of the terminal in a wireless communication system, which includes: a memory; a transceiver; and a processor connecting the memory and the transceiver, in which the processor is configured to receive, from a current cell, a mobility value related to a previous cell when a terminal moves from the previous cell to the current cell, store the received mobility value, and measure the mobility state of the terminal on the basis of the stored mobility value.

The mobility value may be determined based on the size of the previous cell or whether the movement to the current cell is by inter-frequency cell reselection.

The mobility value may have a larger value as the size of the previous cell is larger.

The mobility value may have a smaller value as the coverage of the previous cell and the coverage of the current cell more overlap each other.

The processor may be configured to calculate a sum of one or more mobility values stored for a set time, and measure the mobility state of the terminal by comparing the calculated sum and a predetermined mobility state threshold value.

Corresponding validity timers may be allocated to the mobility values, respectively, and the processor may be configured to delete a mobility value whose validity timer expires from a list storing the mobility values.

According to an exemplary embodiment of the present invention, an accurate mobility state of a terminal can be determined by measuring the mobility state by considering the size of a cell at which the terminal stays and/or interfrequency cell reselection or not.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE. 5G is an evolution of the LTE-A.

For clarity, the following description will focus on LTE-A and 5G. However, technical features of the present invention are not limited thereto.

Figure 1:
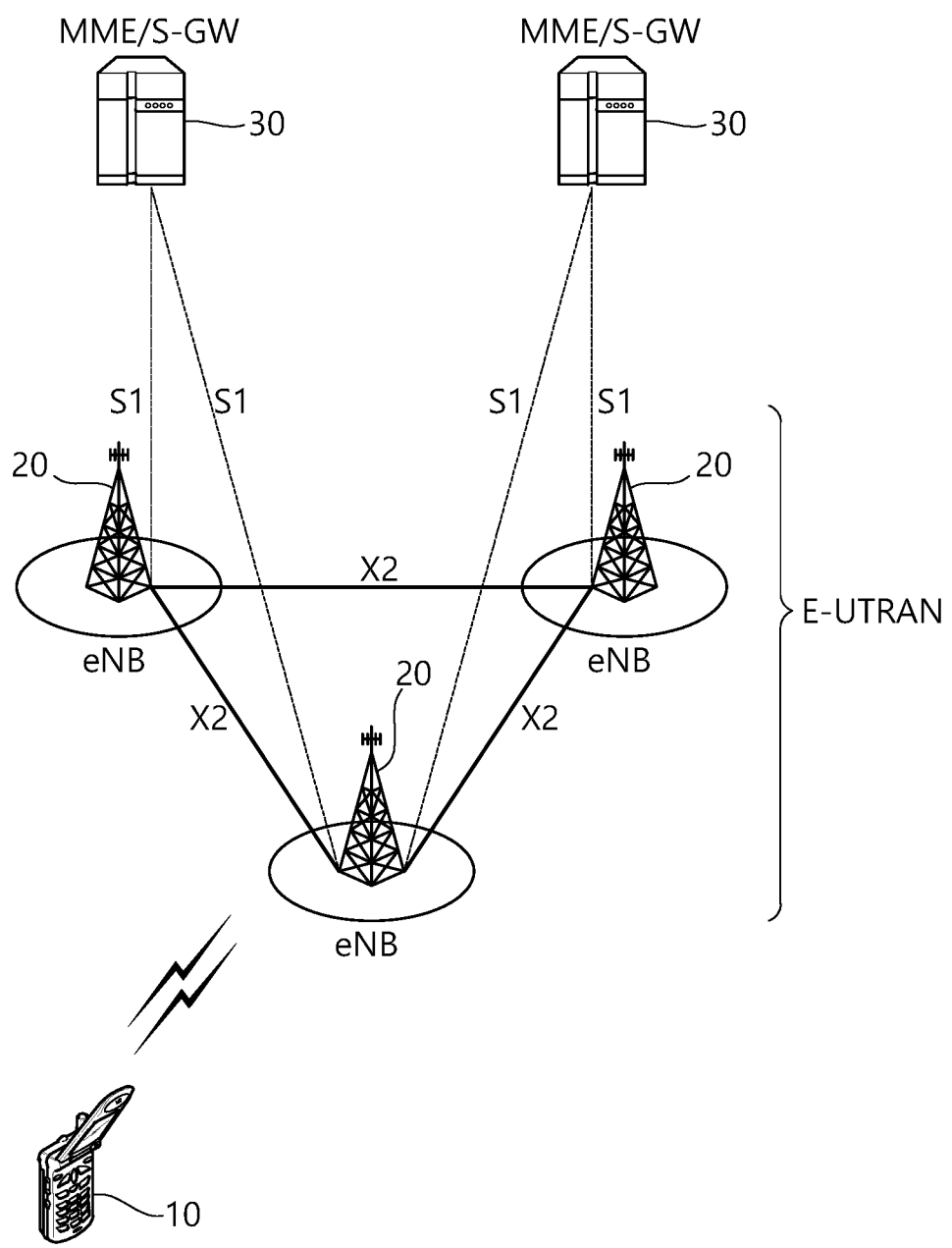
FIG. 1 illustrates a structure of an LTE system.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a serving gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 2:
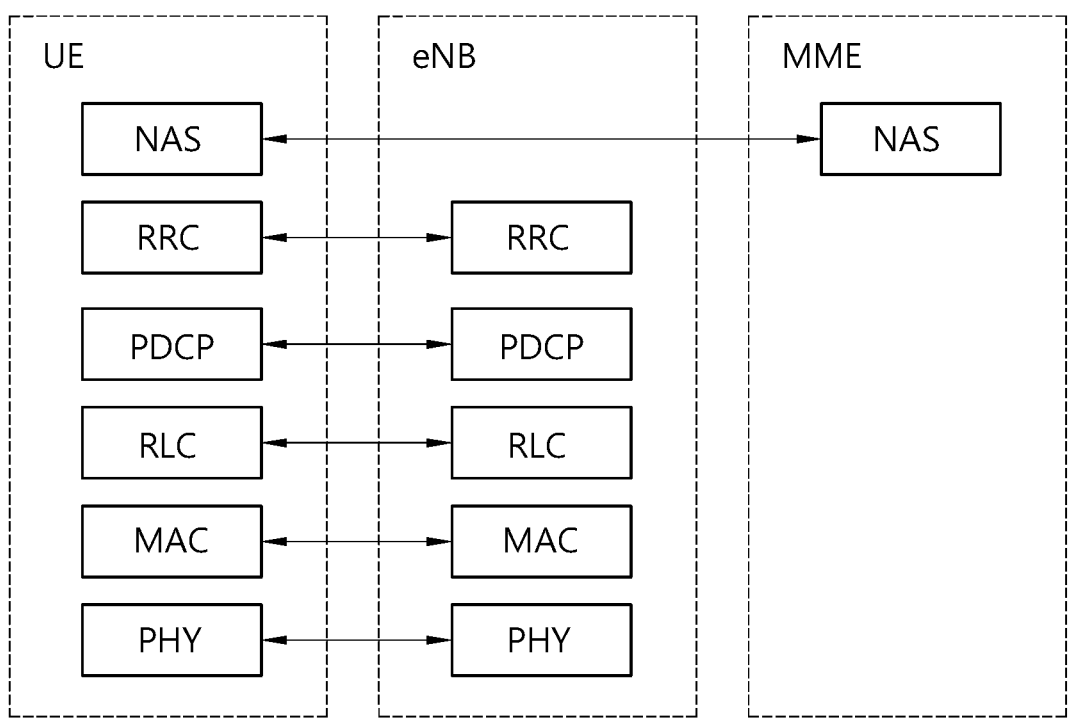
FIG. 2 illustrates a radio interface protocol of the LTE system for a control plane.
Figure 3:
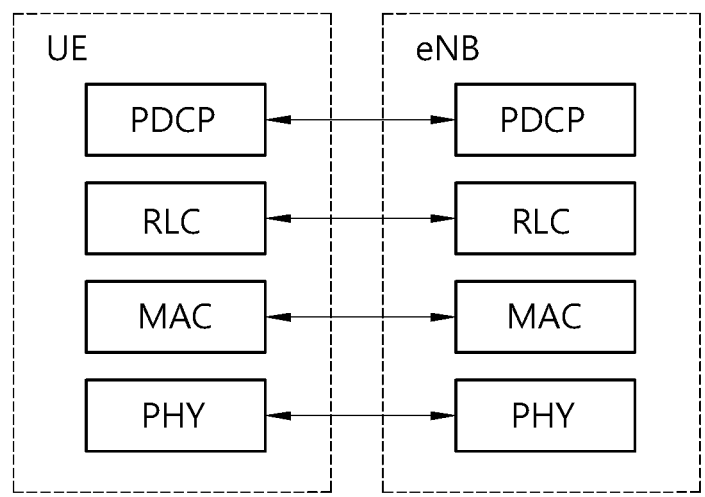
FIG. 3 illustrates the radio interface protocol of the LTE system for a user plane.

FIG. 2 shows a control plane of a radio interface protocol of an LTE system. FIG. 3 shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from a higher layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

A non-access stratum (NAS) layer belongs to an upper layer of the RRC layer and serves to perform session management, mobility management, or the like.

Referring to FIG. 2, the RLC and MAC layers (terminated in the eNB on the network side) may perform functions such as scheduling, automatic repeat request (ARQ), and hybrid automatic repeat request (HARQ). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Referring to FIG. 3, the RLC and MAC layers (terminated in the eNB on the network side) may perform the same functions for the control plane. The PDCP layer (terminated in the eNB on the network side) may perform the user plane functions such as header compression, integrity protection, and ciphering.

Hereinafter, RRC state of UE and RRC connection method is described below.

An RRC state indicates whether an RRC layer of the UE is logically connected to an RRC layer of the E-UTRAN. The RRC state may be divided into two different states such as an RRC connected state and an RRC idle state. When an RRC connection is established between the RRC layer of the UE and the RRC layer of the E-UTRAN, the UE is in RRC_CONNECTED, and otherwise the UE is in RRC_IDLE. Since the UE in RRC_CONNECTED has the RRC connection established with the E-UTRAN, the E-UTRAN may recognize the existence of the UE in RRC_CONNECTED and may effectively control the UE. Meanwhile, the UE in RRC_IDLE may not be recognized by the E-UTRAN, and a CN manages the UE in unit of a TA which is a larger area than a cell. That is, only the existence of the UE in RRC_IDLE is recognized in unit of a large area, and the UE must transition to RRC_CONNECTED to receive a typical mobile communication service such as voice or data communication.

In RRC_IDLE state, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE state, no RRC context is stored in the eNB.

In RRC_CONNECTED state, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED state, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE state, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion.

A paging message is transmitted over all cells belonging to the same tracking area. If the UE moves from one TA to another TA, the UE will send a tracking area update (TAU) message to the network to update its location.

When the user initially powers on the UE, the UE first searches for a proper cell and then remains in RRC_IDLE in the cell. When there is a need to establish an RRC connection, the UE which remains in RRC_IDLE establishes the RRC connection with the RRC of the E-UTRAN through an RRC connection procedure and then may transition to RRC_CONNECTED. The UE which remains in RRC_IDLE may need to establish the RRC connection with the E-UTRAN when uplink data transmission is necessary due to a user's call attempt or the like or when there is a need to transmit a response message upon receiving a paging message from the E-UTRAN.

In order to manage the mobility of the terminal in the NAS layer positioned on the control planes of the terminal and the MME, an EPS mobility management (EMM) registered state and an EMM deregistered state may be defined. The EMM registered state and the EMM deregistered state may be applied to the terminal and the MME. Like a case of turning on the power of the terminal for the first time, an initial terminal is in the EMM deregistered state and the terminal performs a process of registering the terminal in the corresponding network through an initial attach procedure in order to access the network. When the attach procedure is successfully performed, the terminal and the MME is transitioned to the EMM registered state.

To manage a signaling connection between the UE and the EPC, two states are defined, i.e., an EPS connection management (ECM)-IDLE state and an ECM-CONNECTED state. These two states apply to the UE and the MME. When a UE in the ECM-IDLE state establishes an RRC connection with the E-UTRAN, the UE enters the ECM-CONNECTED state. When an MME in the ECM-IDLE state establishes an S1 connection with the E-UTRAN, the MME enters the ECM-CONNECTED state. When the UE is in the ECM-IDLE state, the E-UTRAN does not have context information of the UE. Therefore, the UE in the ECM-IDLE state performs a UE-based mobility related procedure such as cell selection or reselection without having to receive a command of the network. On the other hand, when the UE is in the ECM-CONNECTED state, a mobility of the UE is managed by the command of the network. If a location of the UE in the ECM-IDLE state becomes different from a location known to the network, the UE announces the location of the UE to the network through a tracking area update procedure.

Hereinafter, a 5G network structure is described.

Figure 4:
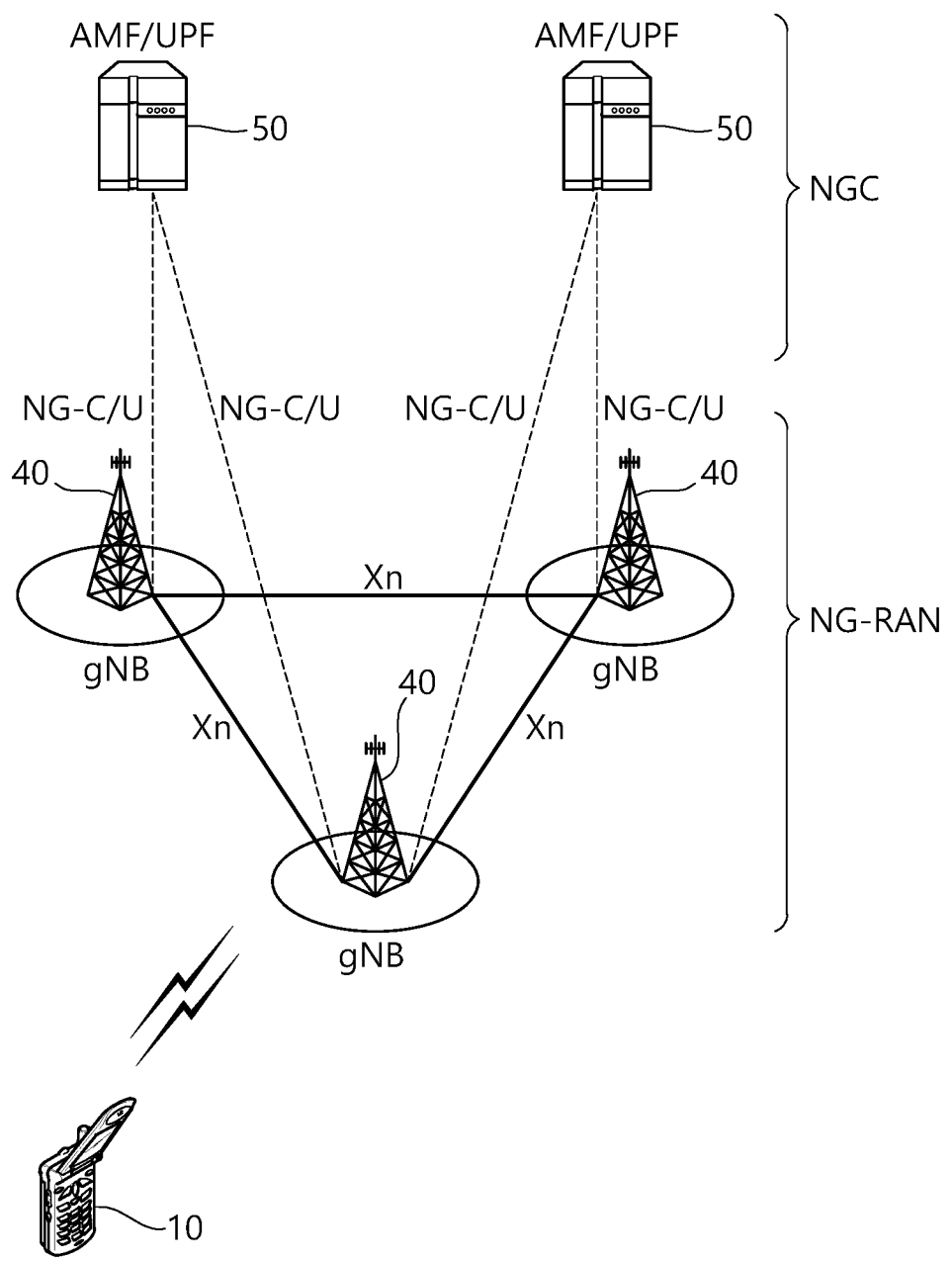
FIG. 4 illustrates a structure of a 5G system.

FIG. 4 shows a structure of a 5G system.

In case of an evolved packet core (EPC) having a core network structure of the existing evolved packet system (EPS), a function, a reference point, a protocol, or the like is defined for each entity such as a mobility management entity (MME), a serving gateway (S-GW), a packet data network gateway (P-GW), or the like.

On the other hand, in case of a 5G core network (or a NextGen core network), a function, a reference point, a protocol, or the like is defined for each network function (NF). That is, in the 5G core network, the function, the reference point, the protocol, or the like is not defined for each entity.

Referring to FIG. 4, the 5G system structure includes at least one UE 10, a next generation-radio access network (NG-RAN), and a next generation core (NGC).

The NG-RAN may include at least one gNB 40, and a plurality of UEs may be present in one cell. The gNB 40 provides the UE with end points of the control plane and the user plane. The gNB 40 is generally a fixed station that communicates with the UE 10 and may be referred to as another terminology, such as a base station (BS), a base transceiver system (BTS), an access point, or the like. One gNB 40 may be arranged in every cell. At least one cell may be present in a coverage of the gNB 40.

The NGC may include an access and mobility function (AMF) and a session management function (SMF) which are responsible for a function of a control plane. The AMF may be responsible for a mobility management function, and the SMF may be responsible for a session management function. The NGC may include a user plane function (UPF) which is responsible for a function of a user plane.

Interfaces for transmitting user traffic or control traffic may be used. The UE 10 and the gNB 40 may be connected by means of a Uu interface. The gNBs 40 may be interconnected by means of an X2 interface. Neighboring gNBs 40 may have a meshed network structure based on an Xn interface. The gNBs 40 may be connected to an NGC by means of an NG interface. The gNBs 40 may be connected to an AMF by means of an NGC interface, and may be connected to a UPF by means of an NG-U interface. The NG interface supports a many-to-many-relation between the gNB 40 and the AMF/UPF 50.

A gNB host may perform functions such as functions for radio resource management, IP header compression and encryption of user data stream, selection of an AMF at UE attachment when no routing to an AMF can be determined from the information provided by the UE, routing of user plane data towards UPF(s), scheduling and transmission of paging messages (originated from the AMF), scheduling and transmission of system broadcast information (originated from the AMF or O&M), or measurement and measurement reporting configuration for mobility and scheduling.

An access and mobility function (AMF) host may perform primary functions such as NAS signalling termination, NAS signalling security, AS security control, inter CN node signalling for mobility between 3GPP access networks, idle mode UE reachability (including control and execution of paging retransmission), tracking area list management (for UE in idle and active mode), AMF selection for handovers with AMF change, access authentication, or access authorization including check of roaming rights.

A user plane function (UPF) host may perform primary functions such as anchor point for Intra-/inter-RAT mobility (when applicable), external PDU session point of interconnect to data network, packet routing & forwarding, packet inspection and user plane part of policy rule enforcement, traffic usage reporting, uplink classifier to support routing traffic flows to a data network, branching point to support multi-homed PDU session, QoS handling for user plane, e.g. packet filtering, gating, UL/DL rate enforcement, uplink traffic verification (SDF to QoS flow mapping), transport level packet marking in the uplink and downlink, or downlink packet buffering and downlink data notification triggering.

A session management function (SMF) host may perform primary functions such as session management, UE IP address allocation and management, selection and control of UP function, configuring traffic steering at UPF to route traffic to proper destination, controlling part of policy enforcement and QoS, or downlink data notification.

Hereinafter, an RRC_INACTIVE state of a UE is described.

In the discussion on the NR standardization, an RRC_INACTIVE state (RRC inactive state) has been newly introduced in addition to the existing RRC_CONNECTED state and RRC_IDLE state. The RRC_INACTIVE state may be a concept similar to a lightly connected mode or lightweight connection mode which is under discussion in LTE. The RRC_INACTIVE state is a state introduced to efficiently manage a specific UE (for example, mMTC UE). A UE in the RRC_INACTIVE state performs a radio control procedure similarly to a UE in the RRC_IDLE state in order to reduce power consumption. However, the UE in the RRC_INACTIVE state maintains a connection state between the UE and a network similarly to the RRC_CONNECTED state in order to minimize a control procedure required when transitioning to the RRC_CONNECTED state. In the RRC_INACTIVE state, a radio access resource is released, but wired access may be maintained. For example, in the RRC_INACTIVE state, the radio access resource is released, but an NG2 interface between a gNB and am NGC or an S1 interface between an eNB and an EPC may be maintained. In the RRC_INACTIVE state, a core network recognizes that the UE is normally connected to a BS. The RRC_INACTIVE state and a lightly connected mode may be considered as practically identical.

Meanwhile, in the E-UTRAN, the UE in the RRC_CONNECTED state does not support the UE-based cell reselection procedure. However, the UE in the RRC_INACTIVE state can perform the cell reselection procedure, and in this case, the UE should inform the E-UTRAN of the location information of the UE.

Hereinafter, a method and procedure in which a UE selects a cell will be described.

A cell selection process is divided into two categories.

First, in an initial cell selection process, the UE does not have previous information about a radio channel. Therefore, in order to search for a suitable cell, the UE searches for all radio channels. The UE searches for a strongest cell in each channel. Thereafter, when the UE finds a suitable cell satisfying a cell selection criterion, the UE selects the corresponding cell.

Next, the UE may select a cell using stored information or using information broadcasting in the cell. Therefore, the UE may quickly select a cell, compared with the initial cell selection process. When the UE finds a cell satisfying a cell selection criterion, the UE selects the corresponding cell. When the UE does not find a suitable cell satisfying the cell selection criterion through this process, the UE performs an initial cell selection process.

After selecting any cell through the cell selection procedure, intensity or a quality of signals between the UE and the base station may be changed due to a change in mobility or a radio environment of the UE. Therefore, when a quality of the selected cell is deteriorated, the UE may select another cell providing a better quality. When the cell is again selected in this way, the UE selects a cell generally providing a better signal quality than that of the currently selected cell. This process is referred to as cell reselection. The cell reselection process has a basic object in selecting a cell providing a best quality to the UE in a quality aspect of a radio signal.

In addition to a quality aspect of a radio signal, the network may determine a priority for each frequency to notify the UE of the priority. The UE, having received such a priority considers the priority more preferentially than radio signal quality criteria in a cell reselection process.

As described above, there is a method of selecting or reselecting a cell according to signal characteristics of a radio environment, and in selecting a cell for reselection, there may be the following cell reselection methods according to RAT and frequency characteristic of the cell.

Intra-frequency cell reselection: the UE reselects a cell having the same RAT as that of a camping cell and the same center-frequency as that of a camping cell Inter-frequency cell reselection: the UE reselects a cell having the same RAT as that of a camping cell and a center-frequency different from that of a camping cell Inter-RAT cell reselection: the UE reselects a cell using RAT different from camping RAT A principle of a cell reselection process is as follows:

First, the UE measures a quality of a serving cell and a neighboring cell for cell reselection.

Second, cell reselection is performed based on cell reselection criteria. Cell reselection criteria have the following characteristics with respect to measurement of the serving cell and the neighboring cell.

Intra-frequency cell reselection is basically performed based on a ranking. The ranking is a work that defines an index value for cell reselection evaluation and that sequences cells in magnitude order of the index value using the index value. A cell having a best index is often referred to as a highest ranked cell. A cell index value is a value that applies a frequency offset or a cell offset, as needed based on a value in which a UE measures for the corresponding cell.

Inter-frequency cell reselection is performed based on a frequency priority provided by the network. The UE attempts to camp on in a frequency having a highest frequency priority. The network may provide a frequency priority to be commonly applied to UEs within a cell through broadcast signaling or may provide a priority for each frequency for each UE through dedicated signaling for each UE. A cell reselection priority provided through broadcast signaling may be referred to as a common priority, and a cell reselection priority set by a network for each UE may be referred to as a dedicated priority. When receiving the dedicated priority, the UE may together receive a validity time related to the dedicated priority. When receiving the dedicated priority, the UE starts a validity timer set to the together received validity time. While the validity timer operates, the UE applies a dedicated priority in an RRC idle mode. When the validity timer has expired, the UE discards a dedicated priority and again applies a common priority.

For inter-frequency cell reselection, the network may provide a parameter (e.g., frequency-specific offset) used for cell reselection for each frequency to the UE.

For intra-frequency cell reselection or inter-frequency cell reselection, the network may provide a neighboring cell list (NCL) to be used for cell reselection to the UE. The NCL includes a cell-specific parameter (e.g., cell-specific offset) to be used for cell reselection.

For intra-frequency or inter-frequency cell reselection, the network may provide a cell reselection black list to be used for cell reselection to the UE. For a cell included in the black list, the UE does not perform cell reselection.

Next, the ranking performed in the cell reselection evaluation process will be described.

A ranking criterion used to give the priority to the cell may be defined as Equation 1.

$$Rs = Qmeas,s + Qhysts$$

$$Rn = Qmeas,n - Qoffset \quad \text{[Equation 1]}$$

Herein, Rs represents the ranking criterion of the serving cell, Rn represents the ranking criterion of the neighboring cell, Qmeas,s represents a quality value measured by the UE with respect to the serving cell, Qmeas,n represents the quality value measured by the UE with respect to the neighboring cell, Qhyst represents a hysteresis value for the ranking, and Qoffset represents an offset between two cells.

At an intra-frequency, Qoffset=Qoffsets,n when the UE receives the offset (Qoffsets,n) between the serving cell and the neighboring cell and Qoffset=0 when the UE does not receive Qoffsets,n.

At an inter-frequency, Qoffset=Qoffsets,n+Qfrequency when the UE receives the offset (Qoffsets,n) for the corresponding cell and Qoffset=Qfrequency when the UE does not receive Qoffsets,n.

When the ranking criterion Rs of the serving cell and the ranking criterion Rn of the neighboring cell fluctuate in a state in which both criteria are similar to each other, the ranking is frequently changed as a fluctuation result, so that the UE may alternately reselect the two cells. Qhyst is a parameter for preventing the UE from alternately reselecting two cells by giving hysteresis in the cell reselection.

The UE measures Rs of the serving cell and Rn of the neighboring cell according to the above equation, and regards the cell having the highest ranking criterion value as the highest ranked cell, and reselects the cell. When the reselected cell is not the suitable cell, the UE excludes the corresponding frequency or the corresponding cell from a cell reselection target.

In general, a high frequency band is primarily used in a small cell for capacity enhancement. In other words, the high frequency band is not suitable for use in a UE that moves at a high speed. Therefore, when the UE moves at a speed of a specific threshold value or more, it is necessary to lower the priority of the high frequency band. Conversely, when the UE moves at a speed less than a specific threshold value, the priority of the high frequency band may be increased.

Hereinafter, cell reselection information used for the cell reselection by the UE will be described.

The cell reselection information may be transmitted while being included in system information broadcasted from the network in the form of the cell reselection parameter and provided to the UE. The cell reselection parameters provided to the UE may be parameters of the following types.

Cell reselection priority (cellReselectionPriority): A parameter specifies the priority of the frequency of E-UTRAN, the frequency of UTRAN, a group of GERAN frequencies, a band class of CDMA2000 HRPD or the band class of CDMA2000 1×RTT.

Qoffsets,n: specifies an offset value between two cells.

Qoffsetfrequency: specifies a frequency specific offset for the E-UTRAN frequency of the same priority.

Qhyst: specifies the hysteresis value for the rank index.

Qqualmin: specifies a minimum required quality level and specified in units of dB.

Qrxlevmin: specifies a minimum required Rx level and specified in units of dB.

TreselectionEUTRA: specifies a cell reselection timer value for E-UTRAN and may be configured with respect to each frequency of E-UTRAN.

TreselectionUTRAN: specifies the cell reselection timer value for UTRAN.

TreselectionGERA: specifies the cell reselection timer value for GERAN.

TreselectionCDMA_HRPD: specifies the cell reselection timer value for CDMA HRPD.

TreselectionCDMA_1×RTT: specifies the cell reselection timer value for CDMA 1×RTT.

Threshx, HighP: specifies an Srxlev threshold value used by the UE in units of DB in cell reselection to an RAT/frequency having a higher priority than a serving frequency. The specific threshold value may be individually configured with respect to each frequency of E-UTRAN and UTRAN, each group of the GERAN frequency, each band class of CDMA2000 HRPD, and each band class of CDMA2000 1×RTT.

Threshx, HighQ: specifies an Squal threshold value used by the UE in units of DB in cell reselection to the RAT/frequency having the higher priority than the serving frequency. The specific threshold value may be individually configured with respect to each frequency of E-UTRAN and UTRAN FDD.

Threshx, LowP: specifies an Srxlev threshold value used by the UE in units of DB in cell reselection to an RAT/frequency having a lower priority than the serving frequency. The specific threshold value may be individually configured with respect to each frequency of E-UTRAN and UTRAN, each group of the GERAN frequency, each band class of CDMA2000 HRPD, and each band class of CDMA2000 1×RTT.

Threshx, LowQ: specifies an Squal threshold value used by the UE in units of DB in cell reselection to an RAT/frequency having a lower priority than the serving frequency. The specific threshold value may be individually configured with respect to each frequency of E-UTRAN and UTRAN FDD.

ThreshServing, LowP: specifies an Srxlev threshold value used by the UE in units of DB in cell reselection to an RAT/frequency having a lower priority.

ThreshServing, LowQ: specifies an Squal threshold value used by the UE in units of DB in cell reselection to an RAT/frequency having a lower priority.

SIntraSerachP: specifies an Srxlev threshold value for intra-frequency measurement in units of dB.

SIntraSerachQ: specifies an Squal threshold value for intra-frequency measurement in units of dB.

SnonIntraSerachP: specifies an Srxlev threshold value for E-UTRAN inter-frequency and inter-RAT measurement in units of dB.

SnonIntraSerachQ: specifies an Squal threshold value for E-UTRAN inter-frequency and inter-RAT measurement in units of dB.

Meanwhile, the cell reselection parameter may be scaled according to the mobility of the UE. The mobility of the UE may be estimated based on the number of times at which the UE moves through the cell reselection and/or handover during a specific time interval, which is referred to as mobility state estimation (MSE). According to the MSE, the mobility of the UE may be estimated to be one of a normal mobility state, a medium mobility state, and a high mobility state.

A parameter that may be used as a criterion for estimating the mobility state of the UE in the MSE may be provided. The TCRmax specifies a specific time interval for movement performance counting of other UEs to the MSE. NCR_H indicates the maximum number of cell reselections for entering high mobility. NCR_M indicates the maximum number of cell reselections for entering intermediate mobility. TCRmaxHyst specifies an additional time interval before the UE may enter the normal mobility state.

The UE in the RRC_IDLE state performs the cell reselection when a cell reselection condition is fulfilled. When the number of times that the UE performs the cell reselection during TCRmax exceeds a first threshold value NCR_H, the mobility state of the UE fulfills a condition of a high mobility state. Meanwhile, when the number of times that the UE performs the cell reselection during TCRmax exceeds a second threshold value NCR_M and does not exceed the first threshold value NCR_H, the mobility state of the UE fulfills the condition of the medium mobility state. When the number of times that the UE performs the cell reselection during TCRmax does not exceed the second threshold value NCR_M, the mobility state of the UE fulfills the condition of the normal mobility state. For example, when the UE is not detected as the high mobility state and the normal mobility state during an additional time interval TCRmaxHyst, the UE may be estimated to be in the medium mobility state. However, when the UE continuously performs the cell reselection between two identical cells, it may not be counted as the number of cell reselections.

A scaling factor may be specified according to the mobility state of the UE according to the MSE and the scaling factor may be applied to one or more cell reselection parameters. For example, the scaling factors sf-Medium and sf-High according to the medium mobility and the high mobility may be applied to Qhyst, TreselectionEUTRA, TreselectionUTRA, TreselectionGERA, TreselectionCDMA_HRPD, and TreselectionCDMA_1×RTT.

According to the MSE in the related art, the size of a cell where a terminal stays and inter-frequency cell reselection or not are not considered. Specifically, a case where the terminal moves from a cell having a large size to another cell has a difference in mobility state of the terminal from a case where the terminal moves from a cell having a small size to another cell. For example, the terminal that moves to another cell passing through the cell having the large size may have a higher mobility state than the terminal that moves to another cell passing through the cell having the small size. In addition, when the terminal moves to another frequency in the same cell, that is, when the terminal performs the inter-frequency cell reselection, the terminal is considered to move to another cell even though the terminal may not substantially move. Due to such a problem, accuracy of measurement of the mobility state of the UE may be lowered.

Hereinafter, a method for measuring a mobility state of a UE according to an exemplary embodiment of the present invention will be described. According to an exemplary embodiment of the present invention, an accurate mobility state of the may be determined by measuring the mobility state by considering the size of a cell at which the UE stays and/or inter-frequency cell reselection or not.

Figure 5:
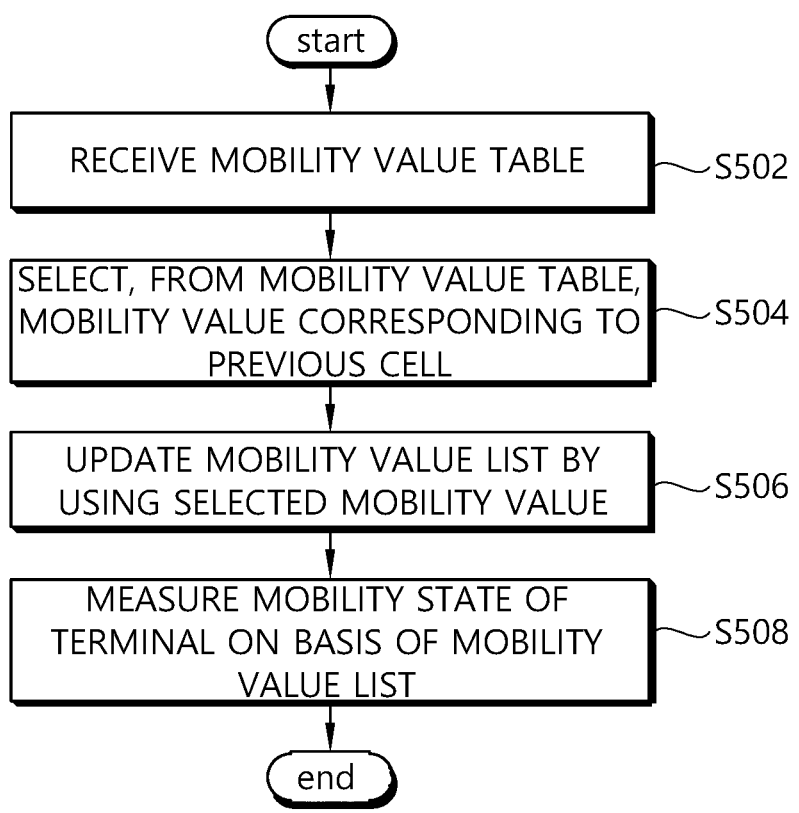
FIG. 5 is a flowchart for describing a method for measuring a mobility state of a UE according to an exemplary embodiment of the present invention.

FIG. 5 is a flowchart for describing a method for measuring a mobility state of a UE according to an exemplary embodiment of the present invention. The UE may perform the following process when a serving cell or primary cell (PCell) is changed according to a cell reselection procedure or handover procedure. When the UE is in the RRC idle state, a new serving cell or PCell may be changed through the handover procedure when the UE is in the RRC connected state through the cell reselection procedure.

In step S502, the UE may receive a mobility value table from the new serving cell or PCell after the cell reselection or handover procedure. Here, the mobility value table may represent the mapping relationship of the current cell, the neighboring cell, and the mobility value. That is, the mobility value table may include mobility values corresponding to the neighboring cells, respectively in a specific current cell. For example, in the mobility value table, the mobility value of cell a may be 0.5, the mobility value of cell b may be 1.0, and the mobility value of cell c may be 0. The mobility value of cell a represents a corresponding mobility value when the UE moves from cell a to the current cell. The mobility value reflects the size of the previous cell, and it may be considered whether the current cell overlaps the range of the previous cell.

In step S504, the UE may select one of the mobility values corresponding to the previous serving cell or the previous PCell from the received mobility value table. Specifically, when the UE moves from the previous cell to the current cell among the mobility values in the mobility value table, the UE may select the mobility value corresponding to the previous cell. In particular, when the UE is in the RRC idle state, the UE receives a mobility value table including mobility values corresponding to all cases where the UE moves from a plurality of neighboring cells to the current cell, and as a result, the UE needs to the mobility values corresponding to the current residence cell and the previous cell. On the other hand, when the UE is in the RRC connected cell, only one mobility value corresponding to the previous PCell may be received through a dedicated signal. When the UE is in the RRC connected state, a step of selecting any one of the plurality of mobility values need not be performed.

In step S506, the UE may update a pre-stored mobility value list using the selected mobility value. The mobility value list may be a list constituted by a plurality of mobility values. Specifically, after cell reselection or handover, the UE may add the selected mobility value to the existing mobility value list. Further, the UE may regard the mobility value as invalid when Tvalid has expired from the time when each mobility value is stored in the mobility value list, and delete the mobility value from the mobility value list. Tvalid may be set by the network as a validity timer for each mobility value in the mobility value list.

In step S508, the UE may measure the mobility state of the UE based on the stored mobility value list. Specifically, the UE may obtain the sum of all lists of the mobility value list. The lists of the mobility value list indicate the mobility values constituting the mobility value list. When the UE moves from a specific cell to another cell, the mobility value for another cell may be added to the mobility value list. The list of the mobility value list may be constituted by values measured within a set time.

When the sum of the lists exceeds a first threshold value (or a highest value among set mobility threshold values), it may be determined that the UE enters a first mobility state, that is, a highest mobility state.

Further, when the sum of the lists has the first threshold value or less and exceeds a second threshold value, it may be determined that the UE enters a second mobility state, that is, a second highest mobility state.

In addition, when the sum of the lists has the second threshold value or less and exceeds a third threshold value, it may be determined that the UE enters the third mobility state, that is, a third highest mobility state.

By such a method, the UE may measure the mobility state. Last, when the sum of the lists has a last threshold value or less, it may be determined that the UE enters a last mobility state, that is, a lowest mobility state.

When at least one of the following conditions is satisfied, the UE may measure the mobility state of the UE.

Condition 1: New list, i.e., mobility value is to be added to mobility value list Condition 2: One of stored mobility values is to be deleted Condition 3: Periodic MSE timer is to expire When the periodic MSE timer has expired, the UE may measure the mobility value of the UE and restart an MSE timer.

When the list does not exist in the mobility value list, such as a case where the UE is just powered on, the UE may configure an initial list of the mobility value list.

For example, the network may provide a default mobility value to the UE and the UE may measure the mobility state by considering the received default mobility value as the medium mobility state. Specifically, a separate validity timer may be provided for the default mobility value. When the UE sets the initial list of the mobility value list as the default mobility value, the UE may start the separate validity timer. When the separately set valid timer has expired, the UE may delete the default mobility value from the mobility value list.

Figure 6:
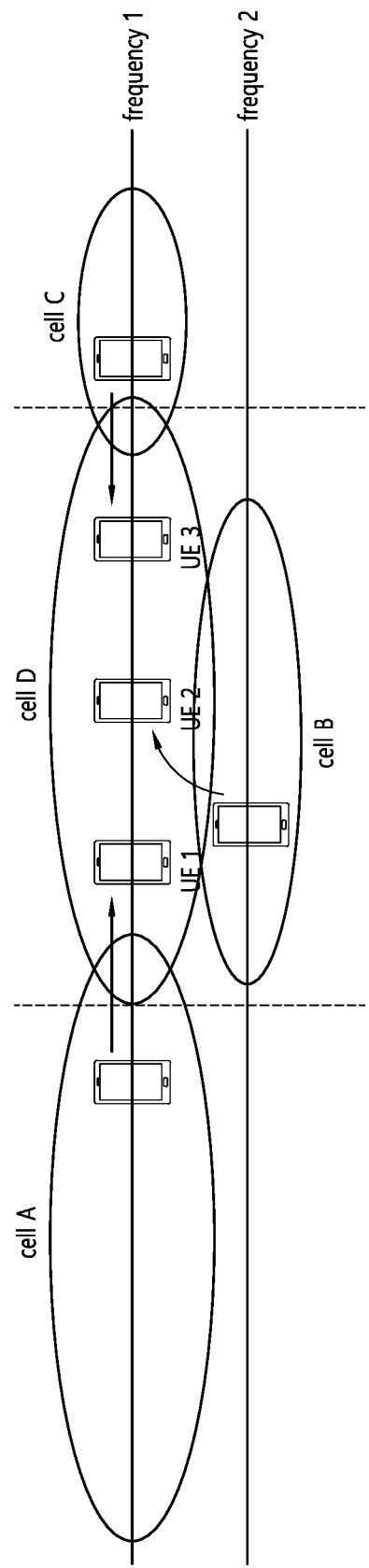
FIG. 6 is an exemplary diagram for describing a method for measuring a mobility state of a UE according to an exemplary embodiment of the present invention.

FIG. 6 is an exemplary diagram for describing a method for measuring a mobility state of a UE according to an exemplary embodiment of the present invention.

Referring to FIG. 6, UE 1 may be handed over from cell A to cell D. Further, UE 2 may change the serving cell from cell B to cell D through the cell reselection procedure. In addition, UE 3 may change the serving cell from cell C to cell D through the cell reselection procedure. Cells A, D, and C may be formed on frequency 1 and cell B may be formed on frequency 2.

According to an exemplary embodiment, the mobility value table provided in cell D is shown in Table 1. For example, when the previous cell is cell A, the mobility value may be 1.2, when the previous cell is cell B, the mobility value may be 0, and when the previous cell is cell C, the mobility value may be 0.6. In particular, since the size of cell A is large, the corresponding mobility value is larger than that of cell C formed on the same frequency. In addition, since cell B is different from cell D in frequency and is not actually a cell formed in a different space, the UE may not move and in this case, the mobility value becomes zero.

TABLE 1

| Previous serving cell ID | Mobility value |
| --- | --- |
| Cell A | 1.2 |
| Cell B | 0 |
| Cell C | 0.6 |
| ... | ... |

Specifically, after the handover, UE 1 moving from cell A may receive the mobility value (1.2) corresponding to cell A from cell D through dedicated signaling. Further, after the cell reselection procedure, UE 2 and UE 3 may receive the mobility value table from cell D through broadcasting signaling. The UE may select the mobility value corresponding to the ID of the previous serving cell. That is, UE 2 may select a mobility value of 0 corresponding to cell B and UE 3 may select a mobility value of 0.6 corresponding to cell C.

Figure 7:
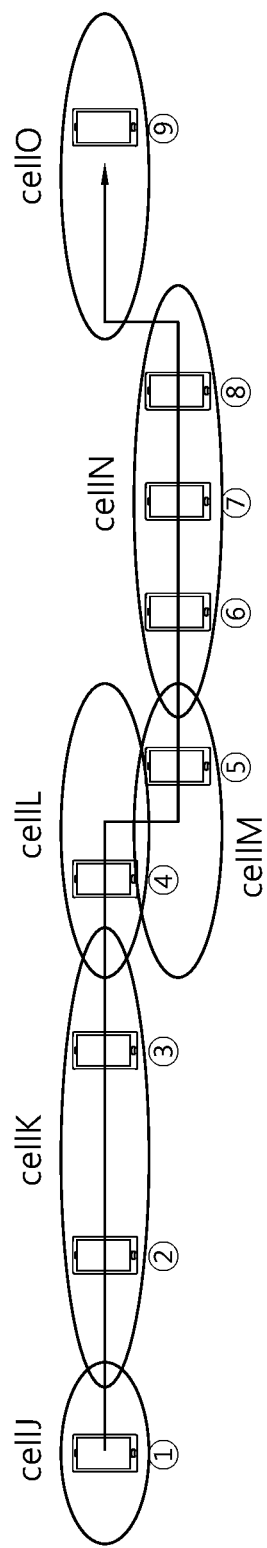
FIG. 7 is an exemplary diagram for describing a method for measuring a mobility state of a UE according to an exemplary embodiment of the present invention.

FIG. 7 is an exemplary diagram for describing a method for measuring a mobility state of a UE according to an exemplary embodiment of the present invention.

Referring to FIG. 7, the UE may move from cell J to cell O through the handover or cell reselection procedure. Cell J, cell K, cell L, and cell O may be formed on frequency Z. Meanwhile, cell M and cell N may be formed on frequency W.

The mobility values, the mobility value lists stored in the UE, and mobility states of the UE measured based on the mobility value lists depending on each of the previous cell and the serving cell of the UE according to an exemplary embodiment of the present invention are summarized in Table 2 below.

TABLE 2

| Step | Previous cell | Current cell | Mobility value | Mobility value list | Sum | Measured mobility state |
| --- | --- | --- | --- | --- | --- | --- |
| 1 | — | J | — | 5 | 5 | Normal |
| 2 | J | K | 0.5 | 5, 0.5 | 5.5 | Normal |
| 3 | — | — | — | — | 5.5 | Normal |
| 4 | K | L | 1.2 | 5, 0.5, 1.2 | 6.7 | Fast |
| 5 | L | M | 0 | 5, 0.5, 1.2 | 6.7 | Fast |
| 6 | M | N | 0.7 | 5, 0.5, 1.2, 0.7 | 7.4 | Very Fast |
| 7 | — | — | −0.5 | 5, 1.2, 0.7 | 6.9 | Fast |
| 8 | — | — | −5 | 1.2, 0.7 | 1.9 | Very slow |
| 9 | N | O | 1.1 | 1.2, 0.7, 1.1 | 3.0 | Slow |

Referring to Table 2, when the UE is powered on in cell J (step 1), the UE may set a first list of the mobility value list to a default value because the mobility value list is not stored in the UE. The default value may be set by the network, for example, 5. In addition, a mobility threshold value may be set by the network as follows.

First threshold value corresponding fastest state=7
Second threshold value corresponding fast state=6
Third threshold value corresponding normal state=4.5
Fourth threshold value corresponding slow state=2.5

A case (step 2) where cell reselection is performed from cell J to cell K will be described. After the cell reselection, the UE may receive the mobility value table from cell K, which is the new serving cell. Referring to Table 2, the mobility value corresponding to cell J, which is the previous cell, is 0.5. In this case, the UE may additionally store a new mobility value (i.e., 0.5) in the previously stored mobility value list. Then, the UE may measure the mobility state of the UE by calculating the sum of all mobility values stored in the mobility value list. Since the sum (i.e., 5.5) of the mobility values exceeds the third threshold value, but does not exceed the second threshold value, the UE may determine that the UE is in the normal mobility state.

The UE may enter the RRC connected state in cell K and the sum of the mobility values may not be updated when the RRC state of the UE is changed (step 3).

A case (step 4) where the UE is handed over from cell K to cell L will be described. After the handover, the UE may update the mobility value list and measure the mobility state of the UE based on the updated mobility value list. Referring to Table 2, the mobility value corresponding to the handover from cell K to cell L may be 1.2. Since the size of cell K is relatively large, the mobility state of the UE entering cell L through cell K may be high. Therefore, the mobility value corresponding to cell K in the mobility value table of the UE may be given as a large value. Further, the UE may add the mobility value to the mobility value list and update the sum of the mobility values. In this example, the sum of the mobility values is 6.7, which exceeds the second threshold value, but below the first threshold value. Therefore, the UE may determine that the UE is in the fast mobility state.

A case (step 5) where the UE moves from cell L to cell M will be described. Here, cell L and cell M, which are cells formed on different frequencies, and may exist in substantially the same space. That is, the UE does not substantially move, except that the frequency at which the UE resides is changed to the frequency constituting cell M from the frequency constituting cell L (for example, inter-frequency cell reselection). Therefore, the mobility value when the UE moves from cell L to cell M having the same coverage as cell L may be 0, and the sum of the mobility values is not changed. If the coverage of cell L and cell M do not overlap, the mobility value may not be zero. That is, the mobility value may be determined according to the degree of coverage overlap between the current cell and the previous cell. Therefore, although the UE moves from cell L to cell M, the mobility state of the UE may be maintained similarly.

A case (step 6) where the UE moves from cell M to cell N will be described. The UE may move from cell M to cell N on the same frequency and in this case, the corresponding mobility value may be 0.7. Accordingly, the UE may add the mobility value to the mobility value list and update the sum of the mobility values. Referring to Table 2, the sum of the mobility values is 7.4, which exceeds the first threshold value. Therefore, the UE may determine that the UE is in the fastest mobility state.

A case where the UE moves within cell N (steps 7 and 8) will be described. The UE may determine that a second list of the stored mobility value list is invalid and delete the second list from the mobility value list. Specifically, respective validity timers may be provided to the values of the mobility value list. When any one validity timer has expired, the UE may delete the mobility value corresponding to the validity timer. The UE may configure a validity value list as a list measured within a set time by using the validity timer for each list. According to one example, the validity timer corresponding to the second list (value) of the mobility value list, i.e., 0.5 may expire and the UE may delete the corresponding mobility value from the mobility value list (step 7). Accordingly, the sum of the mobility values is 6.9, which does not exceed the first threshold value, so that the UE may enter the fast mobility state again.

Further, in this example, the validity timer corresponding to the default mobility value (i.e., 5) may expire (step 8). Accordingly, the UE may delete the corresponding mobility value from the mobility value list. As a result, the sum of the mobility values becomes 1.9, which does not exceed a fourth threshold value, indicating a very slow mobility state.

A case (step 9) where the UE moves from cell M to cell O will be described. The UE move from cell N to cell O which is different in frequency from cell N and is also spatially separated. The mobility value corresponding to the case where the UE moves from cell N to cell O may be 1.1. The UE may add the corresponding mobility value to the mobility value list and update the sum of the mobility values. In this case, the sum of the mobility values is 3.0, indicating the slow mobility state.

Figure 8:
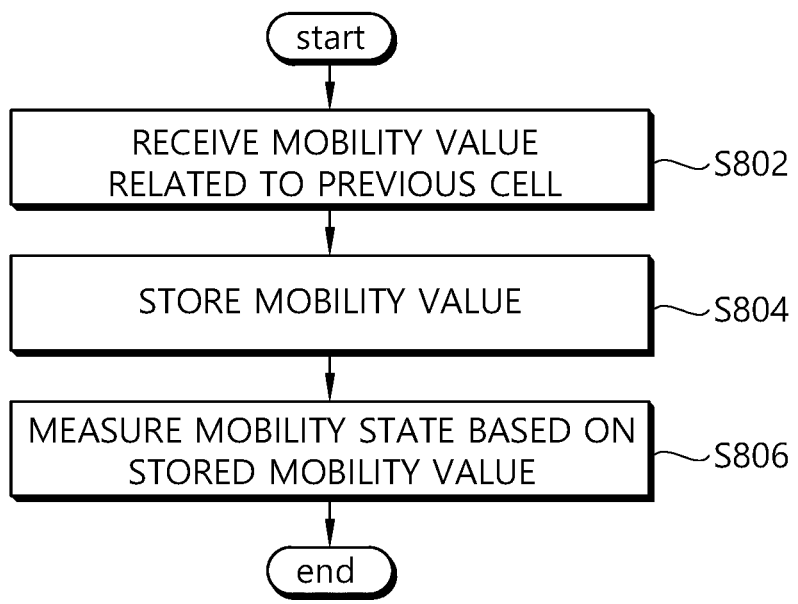
FIG. 8 is a flowchart for describing a method for measuring a mobility state of a UE according to an exemplary embodiment of the present invention.

FIG. 8 is a flowchart for describing a method for measuring a mobility state of a UE according to an exemplary embodiment of the present invention. The method for measuring the mobility state of the UE according to the exemplary embodiment may be applied to both the UEs in the RRC connected state and the RRC idle state.

In step S802, when the UE moves from the previous cell to the current cell, the UE may receive the mobility value associated with the previous cell from the current cell. According to an exemplary embodiment, the UE may receive the default mobility value set by the network from the current cell when the UE is powered on. The mobility value may be determined based on the size of the previous cell or whether the movement to the current cell is by inter-frequency cell reselection. Specifically, the mobility value may have a larger value as the size of the previous cell is larger. In addition, the mobility value may have a smaller value as the coverage of the previous cell and the coverage of the current cell more overlap each other. Meanwhile, when the UE is in the RRC connected state, the UE moves to the current cell through the handover procedure and when the UE is in the RRC idle state, the UE moves to the current cell through the cell reselection procedure.

In step S804, the UE may store the received mobility value. According to an exemplary embodiment, the UE may store the received mobility values in the form of the list.

In step S806, the UE may measure the mobility state of the UE based on the mobility value stored for a set time. According to an exemplary embodiment, the UE may measure the mobility state of the UE by calculating the sum of one or more of the mobility values stored and comparing the sum and a predetermined mobility state threshold value. Meanwhile, the corresponding validity timers may be allocated to the mobility values, respectively and the UE may delete the mobility values whose validity timers have expired from the list in which the mobility values are stored.

Figure 9:
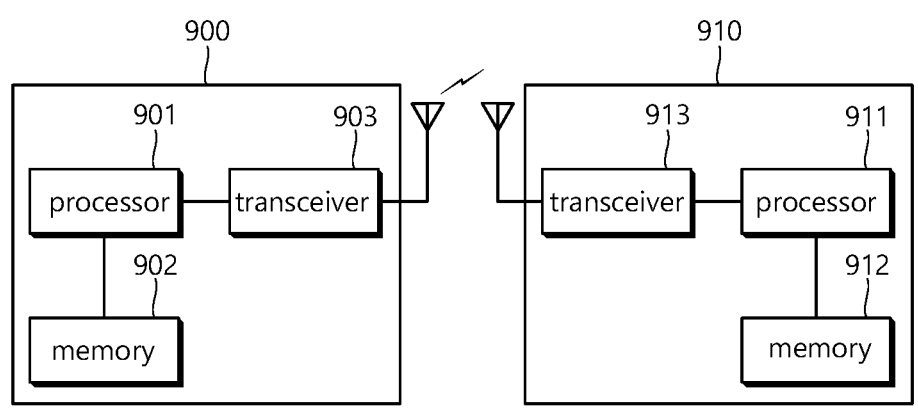
FIG. 9 is a block diagram of a wireless communication system in which an exemplary embodiment of the present invention is implemented.

FIG. 9 is a block diagram illustrating a wireless apparatus in which an embodiment of the present invention can be implemented.

A BS 900 includes a processor 901, a memory 902, and a radio frequency (RF) unit 903. The memory 902 is coupled to the processor 901, and stores a variety of information for driving the processor 901. The RF unit 903 is coupled to the processor 901, and transmits and/or receives a radio signal. The processor 901 implements the proposed functions, procedures, and/or methods. In the aforementioned embodiments, an operation of the BS may be implemented by the processor 901.

A UE 910 includes a processor 911, a memory 912, and an RF unit 913. The memory 912 is coupled to the processor 911, and stores a variety of information for driving the processor 911. The RF unit 913 is coupled to the processor 911, and transmits and/or receives a radio signal. The processor 61 implements the proposed functions, procedures, and/or methods. In the aforementioned embodiments, an operation of the UE 910 may be implemented by the processor 911.

The processors 911 may include application-specific integrated circuit (ASIC), other chipset, logic circuit and/or data processing device. The memories may include read-only memory (ROM), random access memory (RAM), flash memory, memory card, storage medium and/or other storage device. The RF units may include baseband circuitry to process radio frequency signals. When the embodiments are implemented in software, the techniques described herein can be implemented with modules (e.g., procedures, functions, and so on) that perform the functions described herein. The modules can be stored in memories and executed by processors. The memories can be implemented within the processors or external to the processors in which case those can be communicatively coupled to the processors via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the appended claims.

What is claimed is:

1. A method for measuring, by wireless device, a mobility state in a wireless communication system, the method comprising:
selecting a current serving cell;
as a result of selecting the current serving cell, receiving, from the current serving cell, information mapping the current serving cell to each of a plurality of neighbor cells and a plurality of mobility values, where each mobility value corresponds to the current serving cell and a respective one of the plurality of neighbor cells,
wherein each mobility value is determined based on 1) a size of a corresponding neighbor cell among the at least one neighbor cell, and 2) a size of overlapping coverage between the current serving cell and the corresponding neighbor cell;
selecting one mobility value corresponding to a previous serving cell among the plurality of mobility values received in the mapping information;
storing the selected mobility value to a mobility value list;
calculating a sum of all mobility values stored in the mobility value list; and
estimating the mobility state of the wireless device by comparing the calculated sum and a predetermined mobility state threshold value.

2. The method of claim 1, wherein each of the plurality of mobility values related to the plurality of neighbor cells is determined based on whether the selection of the current serving cell from the previous serving cell is caused by an inter-frequency cell reselection.

3. The method of claim 1, wherein each of the plurality of mobility values related to the plurality of neighbor cells has a larger value as the size of the corresponding neighbor cell among the plurality of neighbor cells is larger.

4. The method of claim 1, wherein each of the plurality of mobility values related to the plurality of neighbor cells has a smaller value as the size of overlapping coverage between the current serving cell and the corresponding neighbor cell among the plurality of neighbor cells is larger.

5. The method of claim 1 further comprising:
starting a validity timer upon selecting the mobility value corresponding to the previous serving cell; and
deleting the stored mobility value from the mobility value list after the validity timer expires.

6. The method of claim 1, wherein the wireless device is in an RRC connected state or an RRC idle state.

7. The method of claim 1, wherein the wireless device communicates with at least one of a mobile terminal, a network or autonomous vehicles other than the wireless device.

8. The method of claim 2, wherein each of the plurality of mobility values related to the plurality of neighbor cells is determined to be zero based on the movement to the current serving cell being caused by the inter-frequency cell reselection procedure.

9. A wireless device measuring a mobility state in a wireless communication system, the wireless device comprising:
a memory;
a transceiver; and
a processor a processor functionally connecting the memory and the transceiver,
connecting the memory and the transceiver,
wherein the processor is configured to:
select a current serving cell;
as a result of selecting the current serving cell, control the transceiver to receive, from the current serving cell, information mapping the current serving cell to each of a plurality of neighbor cells and a plurality of mobility values, where each mobility value corresponds to the current serving cell and a respective one of the plurality of neighbor cells,
wherein each mobility value is determined based on 1) a size of a corresponding neighbor cell among the at least one neighbor cell, and 2) a size of overlapping coverage between the current serving cell and the corresponding neighbor cell;
select one mobility value corresponding to a previous serving cell among the plurality of mobility values received in the mapping information;
store the selected mobility value to a mobility value list;
calculate a sum of all mobility values stored in the mobility value list; and
estimate the mobility state of the wireless device by comparing the calculated sum and a predetermined mobility state threshold value.

10. The terminal of claim 9, wherein each of the plurality of mobility values related to the plurality of neighbor cells is determined based on whether the selection of the current serving cell from the previous serving cell is caused by an inter-frequency cell reselection.

11. The terminal of claim 9, wherein each of the plurality of mobility values related to the plurality of neighbor cells has a larger value as the size of the corresponding neighbor cell among the plurality of neighbor cells is larger.

12. The terminal of claim 9, wherein each of the plurality of mobility values related to the plurality of neighbor cells has a smaller value as the size of overlapping coverage between the current serving cell and the corresponding neighbor cell among the plurality of neighbor cells is larger.

13. The terminal of claim 9, wherein the processor is further configured to:
start a validity timer upon selecting the mobility value corresponding to the previous serving cell; and
delete the stored mobility value from the value list after the validity timer expires.

* * * * *